United States Patent
Wakasa et al.

(10) Patent No.: US 9,581,138 B2
(45) Date of Patent: Feb. 28, 2017

(54) WIND TURBINE GENERATOR CONTROL SYSTEM AND METHOD THAT SUPPRESSES AN ELECTRICAL RESONANCE COMPONENT

(71) Applicant: MITSUBISHI HEAVY INDUSTRIES, LTD., Tokyo (JP)

(72) Inventors: Tsuyoshi Wakasa, Tokyo (JP); Naoto Murata, Tokyo (JP); Tsuyoshi Ayagi, Tokyo (JP); Kenichi Aiba, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 671 days.

(21) Appl. No.: 13/855,968

(22) Filed: Apr. 3, 2013

(65) Prior Publication Data
US 2013/0214536 A1 Aug. 22, 2013

Related U.S. Application Data

(63) Continuation of application No. PCT/JP2012/080214, filed on Nov. 21, 2012.

(30) Foreign Application Priority Data

Feb. 6, 2012 (JP) ................................. 2012-023335

(51) Int. Cl.
F03D 9/00 (2016.01)
F03D 7/02 (2006.01)
H02J 3/38 (2006.01)

(52) U.S. Cl.
CPC ........... *F03D 9/003* (2013.01); *F03D 7/0284* (2013.01); *H02J 3/386* (2013.01);
(Continued)

(58) Field of Classification Search
None
See application file for complete search history.

(56) References Cited

U.S. PATENT DOCUMENTS 7,939,956 B1 * 5/2011 Larsen ................. F03D 7/0296
290/44
2002/0145890 A1 * 10/2002 Ainsworth ............. H02M 1/12
363/44
(Continued)

FOREIGN PATENT DOCUMENTS

EP 2317134 A2 5/2011
EP 2375059 A2 10/2011
(Continued)

OTHER PUBLICATIONS

Decision to Grant a Patent mailed Feb. 24, 2015, corresponding to Japanese patent application No. 2012-023335.
(Continued)

*Primary Examiner* — Mohammad Ali
*Assistant Examiner* — Bernard G Lindsay
(74) *Attorney, Agent, or Firm* — Kanesaka Berner & Partners, LLP

(57) ABSTRACT

A power-converter controller is provided in a wind turbine generator which is interconnected to a utility grid and in which a generator generates electrical power by rotation of a rotor having blades. The power-converter controller includes a voltage sensor that measures a generator terminal voltage, resonance-component extracting sections that extract an electrical resonance component generated due to the interconnection from a measurement result measured by the voltage sensor, and a control section and a control section that control a current that flows to the utility grid so as to suppress the resonance component, on the basis of the resonance component extracted by the resonance-component extracting sections. Accordingly, the power-converter
(Continued)

controller can more effectively suppress the resonance generated due to the interconnection of the wind turbine generator to the utility grid.

11 Claims, 10 Drawing Sheets

(52) U.S. Cl.
CPC ... *F05B 2270/304* (2013.01); *F05B 2270/335* (2013.01); *F05B 2270/337* (2013.01); *Y02E 10/723* (2013.01); *Y02E 10/763* (2013.01)

(56) References Cited

U.S. PATENT DOCUMENTS

| | | | |
|---|---|---|---|
| 2007/0121354 A1* | 5/2007 | Jones | H02M 5/4585 363/47 |
| 2010/0246228 A1* | 9/2010 | Kazlauskas | H02M 1/4225 363/127 |
| 2011/0101689 A1 | 5/2011 | Larsen et al. | |
| 2012/0063179 A1* | 3/2012 | Gong | H02M 1/12 363/40 |
| 2012/0081824 A1 | 4/2012 | Narendra et al. | |
| 2012/0200087 A1* | 8/2012 | Schindele | F03D 7/0296 290/44 |
| 2013/0015662 A1* | 1/2013 | Bertolotti | F03D 7/028 290/44 |

FOREIGN PATENT DOCUMENTS

| | | |
|---|---|---|
| JP | 60-148343 A | 8/1985 |
| JP | 2005-184990 A | 7/2005 |
| JP | 2006-281421 A | 10/2006 |
| WO | 2011112571 A2 | 9/2011 |

OTHER PUBLICATIONS

International Search Report and Written Opinion corresponding to PCT/JP2011/064970, dated Feb. 26, 2013.

* cited by examiner

WIND TURBINE GENERATOR CONTROL SYSTEM AND METHOD THAT SUPPRESSES AN ELECTRICAL RESONANCE COMPONENT

CROSS REFERENCE TO RELATED APPLICATIONS

This is a continuation of International Application PCT/JP2012/080214, with an international filing date of Nov. 21, 2012, which is hereby incorporated by reference herein in its entirety.

TECHNICAL FIELD

The present invention relates to a wind-turbine-generator control system, to a wind turbine generator, and to a wind-turbine-generator control method.

BACKGROUND ART

Transmission of power from a wind turbine generator to a utility grid is generally AC power transmission. However, an increase in the length of a power transmission line to the utility grid will increase the inductive reactance, thus limiting the power that can be transmitted.

Thus, a series capacitor is sometimes connected to the power transmission line to decrease (offset or compensate for) the inductive reactance. Connection of the series capacitor to the power transmission line increases the transmissible power. However, since the inductive reactance of the wind turbine generator and the power transmission line forms a serial resonant circuit, a resonance phenomenon occurs depending on the grid configuration and the state of the load, which can damage electrical equipment connected to the grid.

Thus, the following methods have been proposed as countermeasures to be taken when resonance occurs.

A bypass filter (blocking filter) is connected in parallel to the series capacitor connected in series to the power transmission line. A compensating unit that operates actively, such as a thyristor-controlled series capacitor (TCSC), is installed at a current collecting point, such as a substation.

The above two methods need a filter having a capacity corresponding to the power transmission capacity or the amount of power generated by the plant and a compensating unit, thus causing the problem of increasing the cost.

On the other hand, PTL 1 discloses a method for actively suppressing the amplitude of a resonance component under excitation control whereby a resonance component is detected from a current, and a current in a rotor winding of a generator provided in a wind turbine generator is controlled using a power converter. Since the method disclosed in PTL 1 uses existing facilities of the wind turbine generator, an increase in cost for suppressing the resonance component can be reduced.

CITATION LIST

Patent Literature

{PTL 1} U.S. Patent Application, Publication No. 2011/0101689

SUMMARY OF INVENTION

Technical Problem

However, the method of PTL 1 detects a resonance component from the current and has the following problems.

As shown in FIG. 11, current sensors 200 that measure electrical current are provided on, for example, R-phase, S-phase, and T-phase lines of a generator. In the case where the current sensors 200 are sensors each having a general magnetic core 202 for detecting electrical current (load current) flowing through terminals of the generator, a large current flows at the primary side of the current sensor 200 when resonance has occurred. Since a load current produces a magnetic flux $\phi$ generated in the magnetic core 202, the large current flow can saturate the magnetic core 202.

When the magnetic core 202 is saturated, the primary-side current and the secondary-side current take on different values, as shown in FIG. 12, which makes it impossible to correctly measure the electrical current flowing between the terminals of the generator. This makes it difficult for the wind turbine generator to suppress the resonance component. Furthermore, the stator of the generator allows a lot of current to flow therethrough, and the current sensor 200 generally measures a current flowing between the terminals of the stator. However, the current sensor 200 may have a low response because a current flows from the stator through magnetic coupling via a rotor winding.

The present invention is made in view of such circumstances, and an object thereof is to provide a wind-turbine-generator control system, a wind turbine generator, and a wind-turbine-generator control method that more effectively suppresses resonance that occurs due to interconnection of the wind power generator to a utility grid.

Solution to Problems

To solve the above problems, the wind-turbine-generator control system, the wind turbine generator, and the wind-turbine-generator control method of the present invention adopt the following solutions.

A control unit for a wind turbine generator according to a first aspect of the present invention is a wind-turbine-generator control system which is interconnected to a utility grid and in which a generator generates electrical power by rotation of a rotor having blades, the control unit including a measuring unit for measuring at least one of a voltage applied to the generator, a shaft rotational speed of the generator, and a shaft torque of the generator; an extracting unit for extracting an electrical resonance component generated due to the interconnection from the measurement result measured by the measuring unit; and a current control unit for controlling a current that flows to the utility grid so as to suppress the resonance component, on the basis of the resonance component extracted by the extracting unit.

With this configuration, at least one of a voltage applied to the generator, the shaft rotational speed of the generator, and the shaft torque of the generator is measured by the measuring unit. An example of the voltage applied to the generator is a terminal voltage. An electrical resonance component generated due to the interconnection is extracted by the extracting unit from the measurement result measured by the measuring unit, and a current that flows to the utility grid is controlled by the current control unit so as to suppress the resonance component, on the basis of the extracted resonance component.

Here, there is an existing method for detecting whether resonance has occurred by measuring a current flowing through the terminals of the generator by using a current sensor having a magnetic core. However, when resonance has occurred, a large current flows at the primary side of the current sensor, and thus there is a possibility of the magnetic core becoming saturated. Saturation of the magnetic core makes it impossible to correctly measure the electrical current, thus making it difficult to suppress the resonance component.

On the other hand, even if a large current flows, the voltage applied to the generator is hardly influenced. Furthermore, the shaft rotational speed of the generator and the shaft torque of the generator are not influenced by the large current.

Thus, since this configuration allows detection of whether resonance has occurred without being influenced by a large current generated when resonance has occurred, the resonance that occurs due to interconnection of the wind turbine generator to a utility grid can be suppressed more effectively.

In the first aspect described above, the wind turbine generator includes a generator-side power converting unit for converting AC power generated in a rotor winding of the generator to DC power and outputting the DC power to a DC bus and a grid-side power converting unit for converting the DC power received from the DC bus to AC power with the same frequency as that of the utility grid and outputting the AC power to the utility grid; and the current control unit controls an electrical current flowing from the grid-side power converting unit to the utility grid so as to suppress the resonance component, on the basis of the resonance component extracted by the extracting unit.

With this configuration, the response speed is higher compared with the case where the current is made to flow from the generator-side power converting unit via the rotor winding. Furthermore, the frequency of the current for suppressing a resonance component is higher than the frequency of the current through the rotor winding under normal control. Therefore, if the current is made to flow from the generator-side power converting unit via the rotor winding, loss in the rotor winding and the generator-side power converting unit that allows electrical power to flow to the rotor winding increases, which can overheat or damage them. On the other hand, since the frequency of the current that the grid-side power converting unit normally controls is higher than the frequency of the resonance component, the overheating and damage experienced in the case where the current is made to flow from the generator-side power converting unit via the rotor winding do not occur.

In the first aspect, when extracting the resonance component from the shaft rotational speed of the generator, the extracting unit extracts, as the resonance component, a component at a frequency obtained by subtracting the original frequency of the resonance component from the frequency of the utility grid.

The resonance component relative to the shaft rotational speed of the generator is generated in a component at a frequency obtained by subtracting the original frequency of the resonance component from the frequency of the utility grid. Therefore, even if the resonance component is suppressed using the shaft rotational speed of the generator, this configuration allows the resonance to be suppressed more effectively.

In the first aspect, when the magnitude of the resonance component extracted by the extracting unit exceeds a predetermined threshold value, the wind turbine generator is stopped.

This configuration can reliably prevent devices provided in the wind turbine generator, power transmission line, and so on from being damaged due to resonance.

A wind turbine generator according to a second aspect of the present invention includes the control unit described above.

A wind-turbine-generator control method according to a third aspect of the present invention is a wind-turbine-generator control method which is interconnected to a utility grid and in which a generator generates electrical power by rotation of a rotor having blades, the method including measuring at least one of a voltage applied to the generator, a shaft rotational speed of the generator, and a shaft torque of the generator; extracting an electrical resonance component generated due to the interconnection from the measurement result measured in the measuring; and controlling a current that flows to the utility grid so as to suppress the resonance component, on the basis of the resonance component extracted in the extracting.

Advantageous Effects of Invention

The present invention provides the beneficial effect of more effectively suppressing resonance that occurs due to interconnection of a wind turbine generator to a utility grid.

DESCRIPTION OF EMBODIMENTS

Embodiments of a wind-turbine-generator control system, a wind turbine generator, and a wind-turbine-generator control method according to the present invention will be described hereinbelow with reference to the drawings.

First Embodiment

A first embodiment of the present invention will be described hereinbelow.

Figure 1:
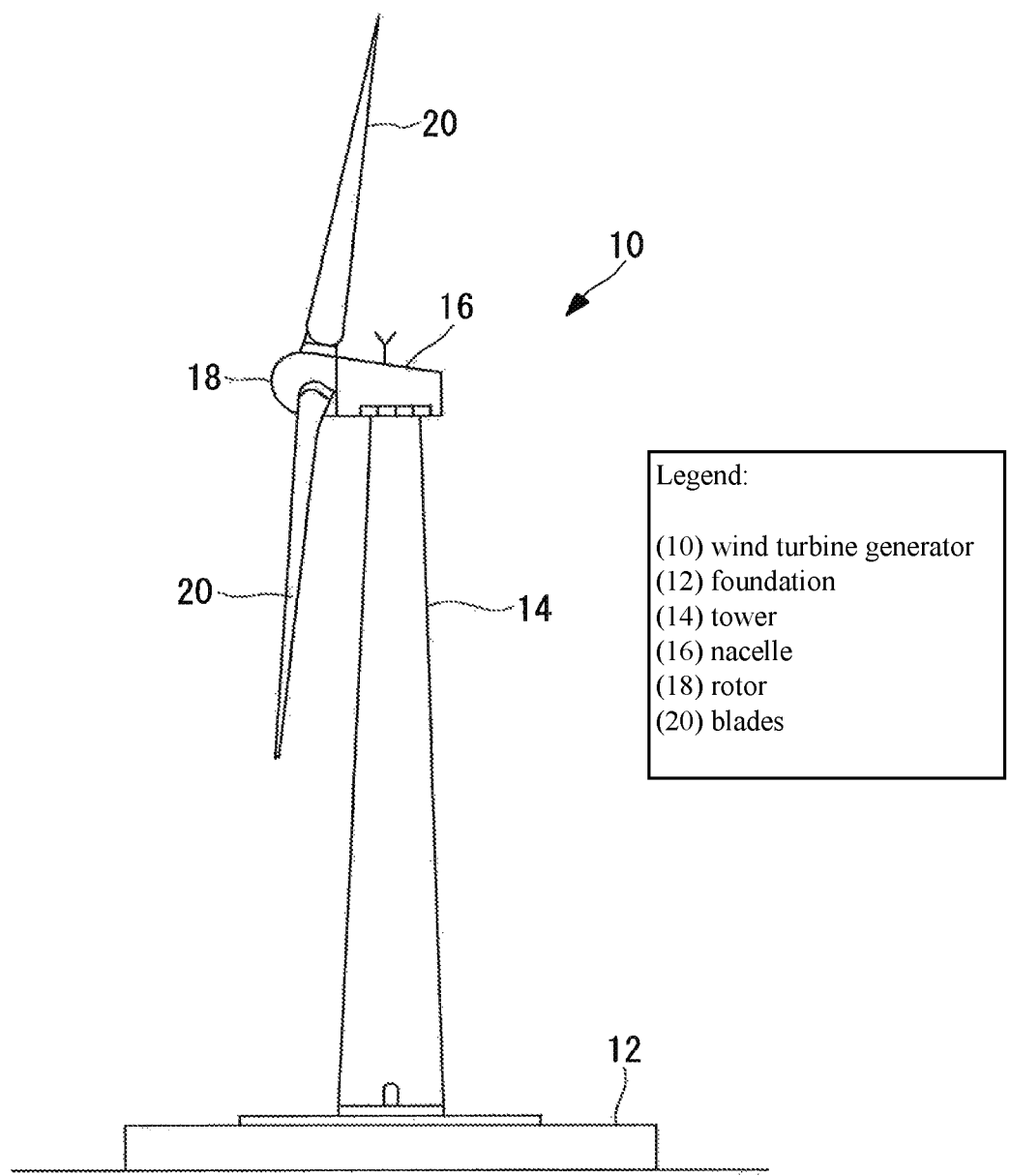
FIG. 1 is an external view of a wind turbine generator according to a first embodiment of the present invention.

FIG. 1 is an external view of a wind turbine generator 10 according to this embodiment.

The wind turbine generator 10 shown in FIG. 1 includes a tower (support column) 14 vertically erected on a foundation 12, a nacelle 16 mounted on the upper end of the tower 14, and a rotor 18 mounted on the nacelle 16 so as to be rotatable about a substantially horizontal axis.

The rotor 18 has a plurality of (in this embodiment, for example, three) blades 20 mounted in a radial pattern about its rotation axis. Thus, the force of wind blowing against the blades 20 from the direction of the rotation axis of the rotor 18 is converted to motive power that rotates the rotor 18 about the rotation axis thereof, and the motive power is converted to electrical power by a generator. The blades 20 are connected to the rotor 18 so that they can be turned relative to the wind direction, so that the pitch angle of the blades 20 can be changed.

Figure 2:
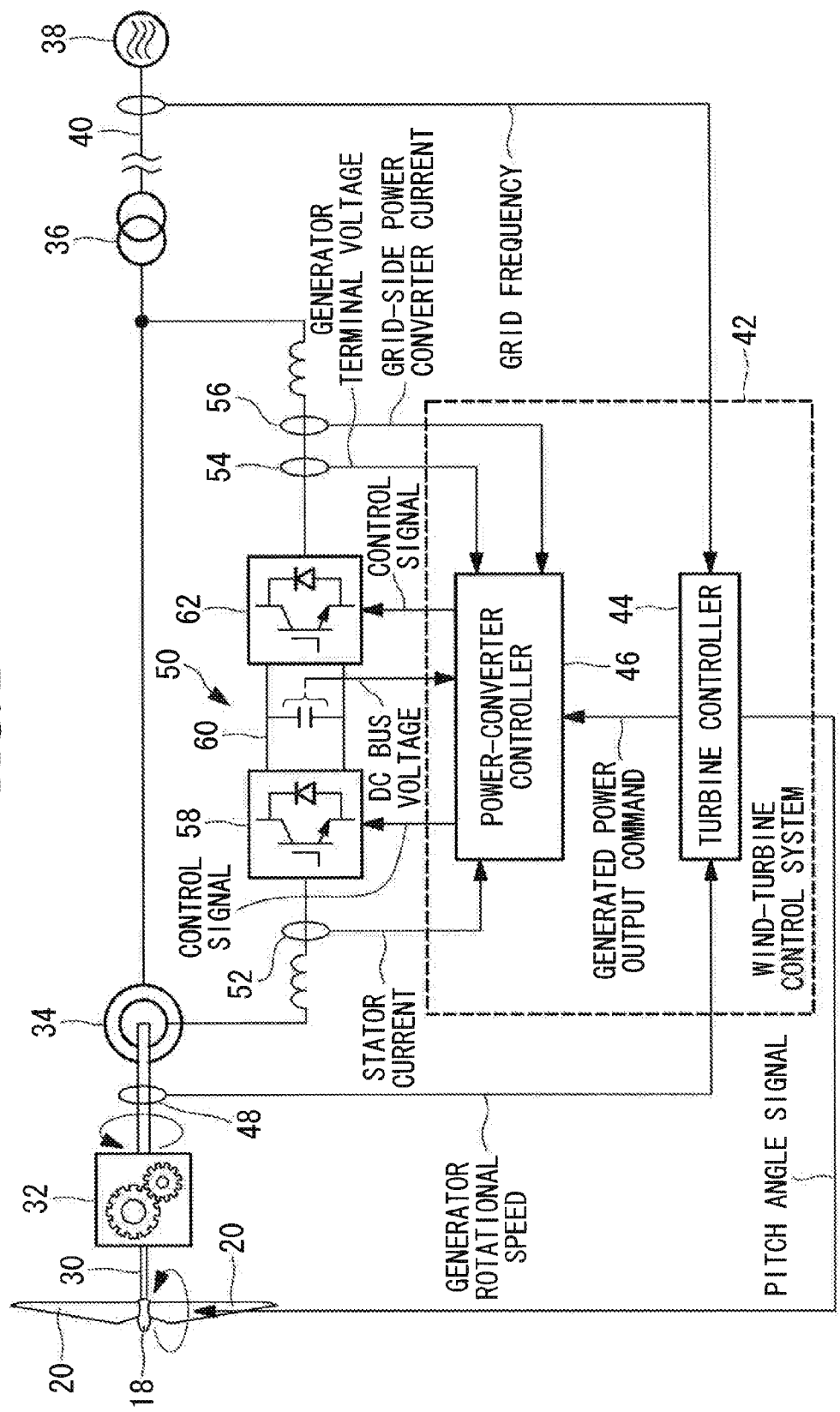
FIG. 2 is a schematic diagram showing the electrical configuration of the wind turbine generator according to the first embodiment of the present invention.

FIG. 2 is a schematic diagram showing the electrical configuration of the wind turbine generator 10 according to the first embodiment.

In the wind turbine generator 10, motive power is transmitted to a generator 34 via a gear box 32 that increases the rotational speed of a main shaft 30 connected to the rotor 18, and the motive power is converted to electrical power by the generator 34. The generator 34 may be, for example, a wound-type induction generator or may be a synchronous generator. The wind turbine generator 10 is connected to a utility grid 38 via a transformer 36 for increasing the voltage and supplies the generated electrical power to the utility grid 38. A power transmission line 40 for transmitting electrical power from the wind turbine generator 10 to the utility grid 38 is provided with a series capacitor (not shown) for decreasing the reactance of the power transmission line 40 to increase the power transmission capacity.

The wind turbine generator 10 further includes a wind-turbine control system 42 that is responsible for controlling the wind turbine generator 10. The wind-turbine control system 42 is constituted of, for example, a central processing unit (CPU), a random access memory (RAM), and a computer-readable recording medium. A series of processes for achieving the various functions of a turbine controller 44 and a power-converter controller 46, to be described later, are recorded in the recording medium or the like in the form of a program. The various functions are achieved by the CPU reading the program into the RAM or the like and executing information processing and computational processing.

The turbine controller 44 generates a blade-pitch-angle command value indicating the pitch angle of the blades 20 on the basis of the measured value of the shaft rotational speed (hereinafter referred to as "generator-shaft rotational speed") of the generator 34 measured by a rotational-speed measuring section 48 and outputs the value to a pitch actuator (not shown) that changes the pitch angle.

The turbine controller 44 further generates a generated power output command indicating the magnitudes of active power and reactive power that the wind turbine generator 10 transmits to the utility grid 38 on the basis of the measured values of the generator rotational speed and the frequency of the utility grid 38 (hereinafter referred to as "grid frequency") and outputs the generated power output command to the power-converter controller 46.

The power-converter controller 46 generates control signals for controlling a power converter 50 on the basis of the generated power output command input thereto.

The power-converter controller 46 according to the first embodiment receives the stator current of the generator 34, which is measured by a current sensor 52, the terminal voltages of the generator 34 (hereinafter referred to as "generator terminal voltages"), which are measured by voltage sensors 54, and grid-side power converter currents measured by current sensors 56 and uses them to generate the control signals described above. The generator terminal voltages are the stator voltages of the generator 34, and the grid-side power converter current is an electrical current that flows from the power converter 50 to the utility grid 38.

The power converter 50 is equipped with a generator-side power converter 58, a DC bus 60, and a grid-side power converter 62 and converts AC power received from the rotor winding of the generator 34 to AC power conforming to the grid frequency on the basis of the control signals. Specifically, the generator-side power converter 58 converts AC power generated in the rotor winding to DC power and outputs the DC power to the DC bus 60. The grid-side power converter 62 converts the DC power received from the DC bus 60 to AC power with the same frequency as that of the utility grid 38 and outputs the AC power to the utility grid 38.

Figure 3:
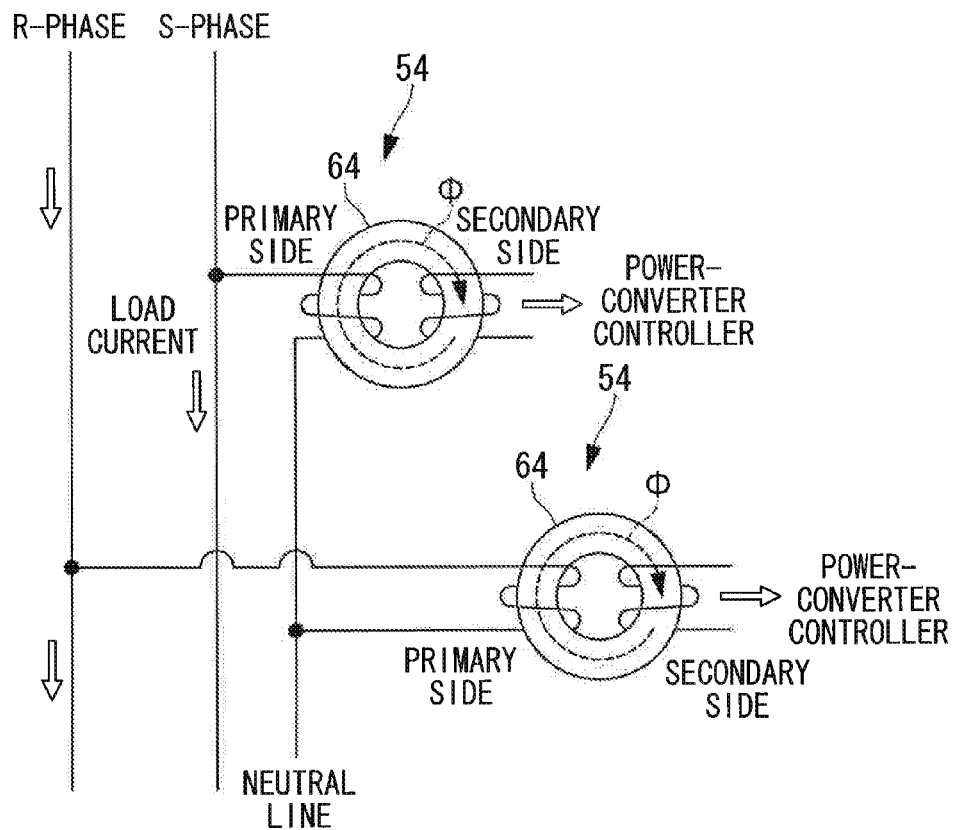
FIG. 3 is a configuration diagram of voltage sensors according to the first embodiment of the present invention.

FIG. 3 is a diagram showing an example of the configuration diagram of the voltage sensors 54 according to the first embodiment.

The voltage sensors 54 are provided, for example, on lines corresponding to the R-phase, S-phase, and T-phase of the generator 34. Lines branching from the R-phase, S-phase, and T-phase (hereinafter referred to as "branch lines") are wound at the primary side of magnetic cores 64, and the branch lines are connected to a neutral line. The voltage sensors 54 output voltages flowing through the secondary side terminals of the magnetic cores 64 to the power-converter controller 46 as generator terminal voltages.

Almost no load current flows at the primary side of the magnetic cores 64 constituting the voltage sensors 54, and the integral of the voltage defines the magnetic flux $\phi$ generated at the magnetic cores 64. Furthermore, even if resonance due to interconnection of the wind turbine generator 10 to the utility grid 38 occurs, and a large current flows as a load current, the voltage applied to the generator 34 is hardly influenced. Therefore, there is a low risk of saturation of the magnetic cores 64, so that the voltage applied to the generator 34 can be accurately measured even if resonance occurs.

Figure 4:
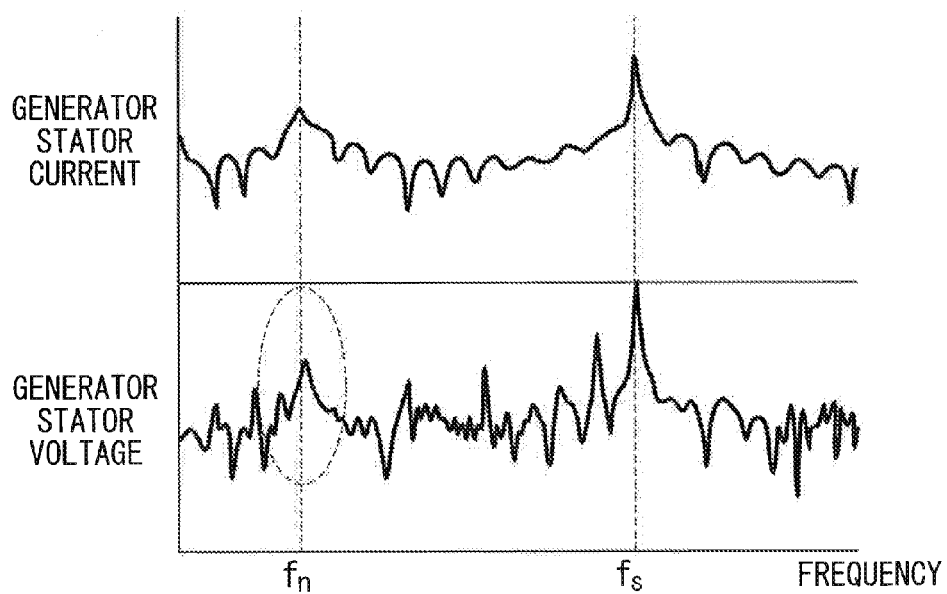
FIG. 4 is a graph showing the frequency spectra of measured generator stator current and generator stator voltage according to the first embodiment of the present invention.

FIG. 4 is a graph showing an example of the frequency spectra of the stator current of the generator 34 (hereinafter referred to as "generator stator current") and the stator voltages of the generator 34, which are generator terminal voltages (hereinafter referred to as "generator stator voltages").

Frequency $f_s$ shown in FIG. 4 is a grid frequency (fundamental component), and frequency $f_n$ is a resonance frequency (subharmonic component). As shown in FIG. 4, a component at the resonance frequency is superposed on the generator stator voltage in a frequency band lower than the grid frequency, similarly to the generator stator current.

The power-converter controller 46 according to the first embodiment extracts an electrical resonance component generated due to the interconnection from the measurement result measured by the voltage sensors 54 and controls a current to be made to flow to the utility grid 38 so as to suppress the resonance component, on the basis of the extracted resonance component.

Figure 5:
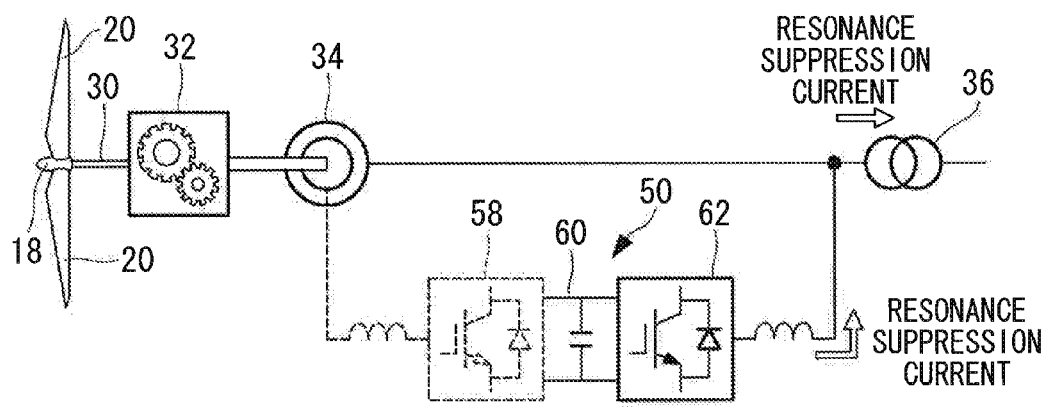
FIG. 5 is a diagram needed for explaining resonance suppression according to the first embodiment of the present invention.

More specifically, as shown in FIG. 5, the power-converter controller 46 according to the first embodiment controls a current flowing from the grid-side power converter 62 to the utility grid 38 (the resonance suppression current in FIG. 5) so as to suppress the resonance component, on the basis of the extracted resonance component. In the case where the resonance suppression current is made to flow from the grid-side power converter 62 to the utility grid 38, the excitation circuit (rotor winding) of the generator 34 may be under normal operation control or operation control in which the load is limited, or the generator 34 may be temporarily stopped.

Figure 6:
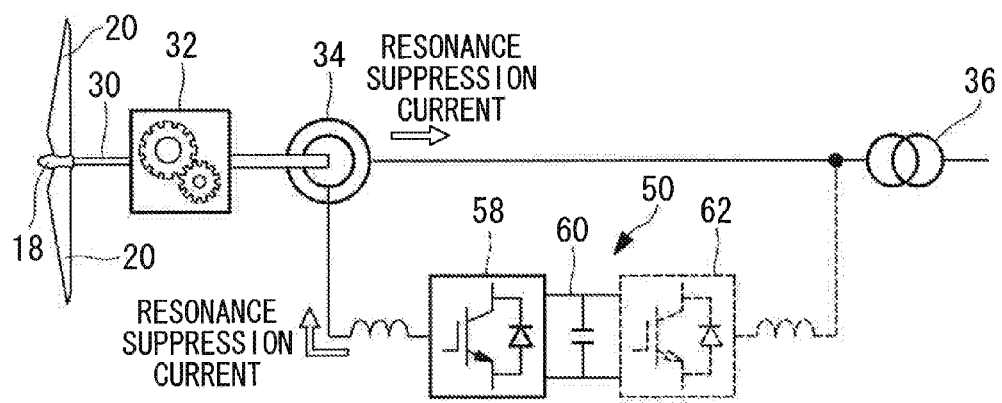
FIG. 6 is a diagram needed for explaining conventional resonance suppression.

Furthermore, the response speed is higher in the case where a resonance suppression current is made to flow from the grid-side power converter 62 to the utility grid 38 compared with the case where the resonance suppression current is made to flow from the generator-side power converter 58 via the rotor winding, as shown in FIG. 6.

Furthermore, the frequency of the resonance-component suppression current is higher than the frequency of the current through the rotor winding under normal control. Therefore, as shown in FIG. 6, if the resonance suppression current is made to flow from the generator-side power converter 58 via the rotor winding, loss in the rotor winding and the generator-side power converter 58 that allows electrical power to flow in the rotor winding increases, which can overheat or damage them. On the other hand, since the frequency of the current that the grid-side power converter 62 normally controls is higher than the frequency of the resonance component, the problem of overheating and damage experienced in the case where the current is made to flow from the generator-side power converter 58 via the rotor winding does not occur.

Figure 7:
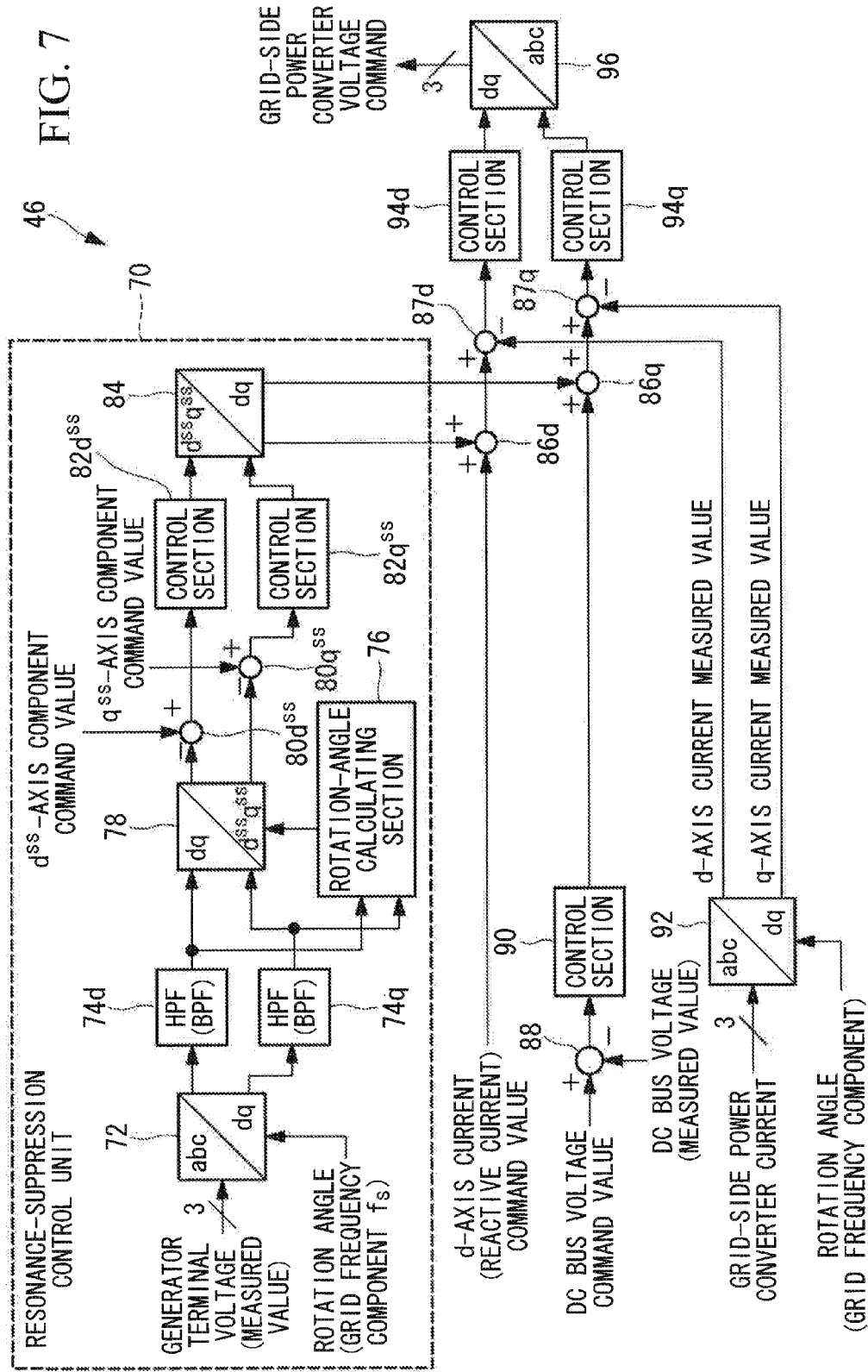
FIG. 7 is a control block diagram of a power-converter controller according to the first embodiment of the present invention for controlling a current to be made to flow from a grid-side power converter to a utility grid.

FIG. 7 is a control block diagram of the power-converter controller 46 for controlling a current that flows from the grid-side power converter 62 to the utility grid 38.

The power-converter controller 46 is equipped with a resonance-suppression control unit 70 that calculates a resonance suppression current value.

The resonance-suppression control unit 70 extracts resonance components from generator terminal voltages and calculates a control command value for suppressing the resonance components, on the basis of the extracted resonance component.

The resonance-suppression control unit 70 will be described in detail hereinbelow.

First, generator terminal voltages in three phases (a-axis, b-axis, and c-axis), which are measurement results measured by the voltage sensors 54, are input to the rotation-coordinate transform section 72.

The rotation-coordinate transform section 72 transforms the rotation coordinates of the three-phase generator terminal voltages to two phases (d-axis and q-axis) by using a grid frequency (for example, 60 Hz or 50 Hz) as a rotation angle and outputs the generator terminal voltages that are transformed to two phases to resonance-component extracting sections 74$d$ and 74$q$, respectively.

Although the generator terminal voltages transformed to two phases should become two orthogonal DC components, the resonance components are superposed on the DC components as abnormal fluctuating components that are not synchronized with the grid frequency, which is the rotation angle.

Therefore, the resonance-component extracting sections 74$d$ and 74$q$ are each constituted of, for example, a high-pass filter (HPF) or a band-pass filter (BPF), which extract the foregoing fluctuating components from the generator terminal voltages transformed to two phases as resonance components and output the resonance components to a rotation-angle calculating section 76 and a rotation-coordinate transform section 78.

The rotation-angle calculating section 76 calculates the frequencies of the resonance components input from the resonance-component extracting sections 74$d$ and 74$q$ by, for example, a vector calculation and outputs the frequencies (rotation angles) obtained by the calculation to the rotation-coordinate transform section 78.

The rotation-coordinate transform section 78 transforms the d-axis resonance component and the q-axis resonance component input from the resonance-component extracting sections 74$d$ and 74$q$ to a $d^{ss}$-axis component and a $q^{ss}$-axis component, which are DC components, by using the rotation angles input from the rotation-angle calculating section 76 and outputs them to a subtracting section 80$d^{ss}$ and a subtracting section 80$q^{ss}$, respectively.

The subtracting section 80$d^{ss}$ calculates the difference between the $d^{ss}$-axis component input from the rotation-coordinate transform section 78 and a $d^{ss}$-axis component command value (for example, 0 (zero)), which is the target value of the $d^{ss}$-axis component, and outputs the difference to a control section 82$d^{ss}$. Furthermore, the subtracting section 80$q^{ss}$ calculates the difference between the $q^{ss}$-axis component input from the rotation-coordinate transform section 78 and a $q^{ss}$-axis component command value (for example, 0 (zero)), which is the target value of the $q^{ss}$-axis component, and outputs the difference to a control section 82$q^{ss}$.

The control section 82$d^{ss}$ calculates a command value for decreasing the difference (hereinafter referred to as "control command value") by PI (Proportional Integral) control or the like on the basis of the difference input from the subtracting section 80dSS and outputs the control command value to a rotation-coordinate transform section 84. Furthermore, the control section 82$q^{ss}$ calculates a control command value for decreasing the difference by PI control or the like on the basis of the difference input from the subtracting section 80qSS and outputs the control command value to the rotation-coordinate transform section 84.

In other words, the control section 82$d^{ss}$ and the control section 82$e$ calculate control command values for suppressing the resonance components on the basis of the resonance components extracted by the resonance-component extracting sections 74$d$ and 74$q$ and control currents to be made to flow to the utility grid 38 to suppress the resonance components.

The rotation-coordinate transform section 84 transforms the control command values input from the control section 82$d^{ss}$ and the control section 82$q^{ss}$ from the $d^{ss}$-axis component and the $q^{ss}$-axis component to a d-axis component and a q-axis component and outputs them to adding sections 86$d$ and 86$q$, respectively.

The adding section 86$d$ adds the d-axis current command value, which is the target value of the reactive current, and the d-axis component input from the rotation-coordinate transform section 84 and outputs the sum to a subtracting section 87$d$.

On the other hand, the difference between a DC bus voltage command value, which is the target value of a DC bus voltage applied to the DC bus 60 that connects the generator-side power converter 58 and the grid-side power converter 62 together, and the measurement value of the DC bus voltage is calculated by a subtracting section 88 and is output to a control section 90 serving as a voltage control unit.

The control section 90 calculates a control command value for decreasing the difference by PI control or the like on the basis of the difference input from the subtracting section 88 and outputs the control command value to the adding section 86$q$.

The adding section 86$q$ adds the control command value input from the control section 90 and the q-axis component input from the rotation-coordinate transform section 84 and outputs the sum to a subtracting section 87$q$.

Furthermore, the measured values of the grid-side power converter currents measured by the current sensors 56 are input to a rotation-coordinate transform section 92.

The rotation-coordinate transform section 92 transforms the rotation coordinates of the three-phase grid-side power converter currents to two phases (d-axis and q-axis) by using a grid frequency (for example, 60 Hz) as a rotation angle and outputs the grid-side power converter currents (the d-axis current measured value and the q-axis current measured value) transformed to two phases to the subtracting sections 87$d$ and 87$q$, respectively.

The subtracting section 87$d$ calculates the difference between the result of addition by the adding section 86$d$ and the d-axis current measured value input from the rotation-coordinate transform section 92 and outputs the difference to a control section 94$d$ serving as a d-axis current control unit. Furthermore, the subtracting section 87$q$ calculates the difference between the result of addition by the adding section 86$q$ and the q-axis current measured value input from the rotation-coordinate transform section 92 and outputs the difference to a control section 94$q$ serving as a q-axis current control unit.

The control section 94$d$ calculates a control command value for decreasing the difference by PI control or the like on the basis of the difference input from the subtracting section 87$d$ and outputs the control command value to a rotation-coordinate transform section 96. Furthermore, the control section 94$q$ calculates a control command value for decreasing the difference by PI control or the like on the basis of the difference input from the subtracting section 87$q$ and outputs the difference to the rotation-coordinate transform section 96.

The rotation-coordinate transform section 96 transforms the control command values input from the control section 94$d$ and the control section 94$q$ from two phases to three phases and outputs the control command values to the grid-side power converter 62 as grid-side power converter voltage commands (control signals), which are the target values of voltages that the grid-side power converter 62 outputs.

In this way, the power-converter controller 46 controls the grid-side power converter 62 so that a current obtained by adding a current for suppressing the resonance component to a current corresponding to the d-axis current command value and the DC bus voltage command value is made to flow to the utility grid 38. This allows the current for suppressing resonance to flow to the utility grid 38 while the wind turbine generator 10 operates normally and supplies electrical power to the utility grid 38.

If the magnitudes of the resonance components extracted by the resonance-component extracting sections 74$d$ and 74$q$ have exceeded a predetermined threshold value, the power-converter controller 46 may output a stop signal for stopping the wind turbine generator 10 to the turbine controller 44. The predetermined threshold value is determined depending on, for example, the upper limit of a current that the wind turbine generator 10 can let flow to the utility grid 38.

When the stop signal is input from the power-converter controller 46, the turbine controller 44 stops the generator 34 and outputs a pitch-angle command value so that the pitch angle of the blades 20 changes to the feather side. Since this stops the wind turbine generator 10, damage to devices provided in the wind turbine generator 10, the power transmission line 40, and so on due to resonance can be reliably prevented.

As described above, the power-converter controller 46 according to the first embodiment is equipped with the voltage sensors 54 that measure the generator terminal voltages, the resonance-component extracting sections 74$d$ and 74$q$ that extract resonance components from the measurement result measured by the voltage sensors 54, and the control section 82$d^{ss}$ and the control section 82$q^{ss}$ that control currents that flow to the utility grid 38 so as to suppress the resonance component, on the basis of the resonance components extracted by the resonance-component extracting sections 74$d$ and 74$q$.

Accordingly, since the power-converter controller 46 according to the first embodiment can detect the resonance without being influenced by a large current generated when resonance has occurred, resonance that occurs due to the interconnection of the wind turbine generator 10 to the utility grid 38 can be suppressed more effectively.

Furthermore, the wind turbine generator 10 is equipped with the generator-side power converter 58 that converts AC power generated in the rotor winding of the generator 34 to DC power and outputs the DC power to the DC bus 60 and the grid-side power converter 62 that converts the DC power received from the DC bus 60 to AC power with the same frequency as that of the utility grid 38 and outputs the AC power to the utility grid 38. The control section 82$d^{ss}$ and the control section 82$q^{ss}$ control the currents flowing from the grid-side power converter 62 to the utility grid 38 on the basis of the resonance components extracted by the resonance-component extracting sections 74$d$ and 74$q$ so as to suppress the resonance components.

In the first embodiment, although the resonance component is extracted for each of the d-axis and the q-axis, the present invention is not limited thereto; only a resonance component of the d-axis or q-axis may be extracted, and the current that flows to the utility grid 38 may be controlled so as to suppress the resonance component, on the basis of any of the extracted resonance components.

Second Embodiment

A second embodiment of the present invention will be described hereinbelow.

Figure 8:
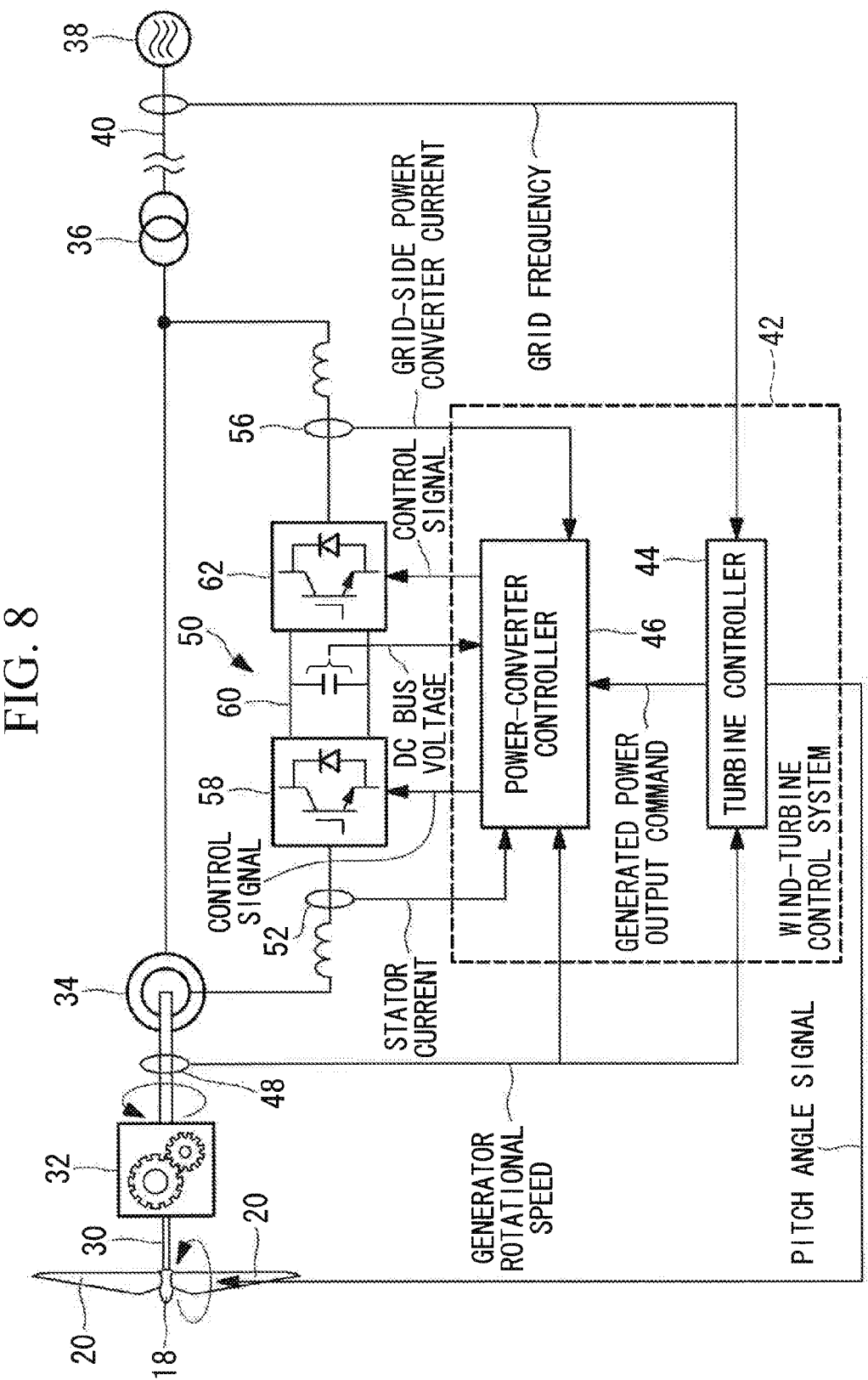
FIG. 8 is a schematic diagram showing the electrical configuration of a wind turbine generator according to a second embodiment of the present invention.

FIG. 8 is a schematic diagram showing the electrical configuration of a wind turbine generator 10 according to the second embodiment. The same components in FIG. 8 as those in FIG. 2 are given the same reference signs as in FIG. 2, and descriptions thereof will be omitted.

The wind turbine generator 10 according to the second embodiment is not equipped with the voltage sensors 54 equipped in the first embodiment; instead, a generator rotational speed measured by the rotational-speed measuring section 48 is input to the power-converter controller 46. The generator rotational speed is not influenced by a large current that is generated when resonance has occurred.

Figure 9:
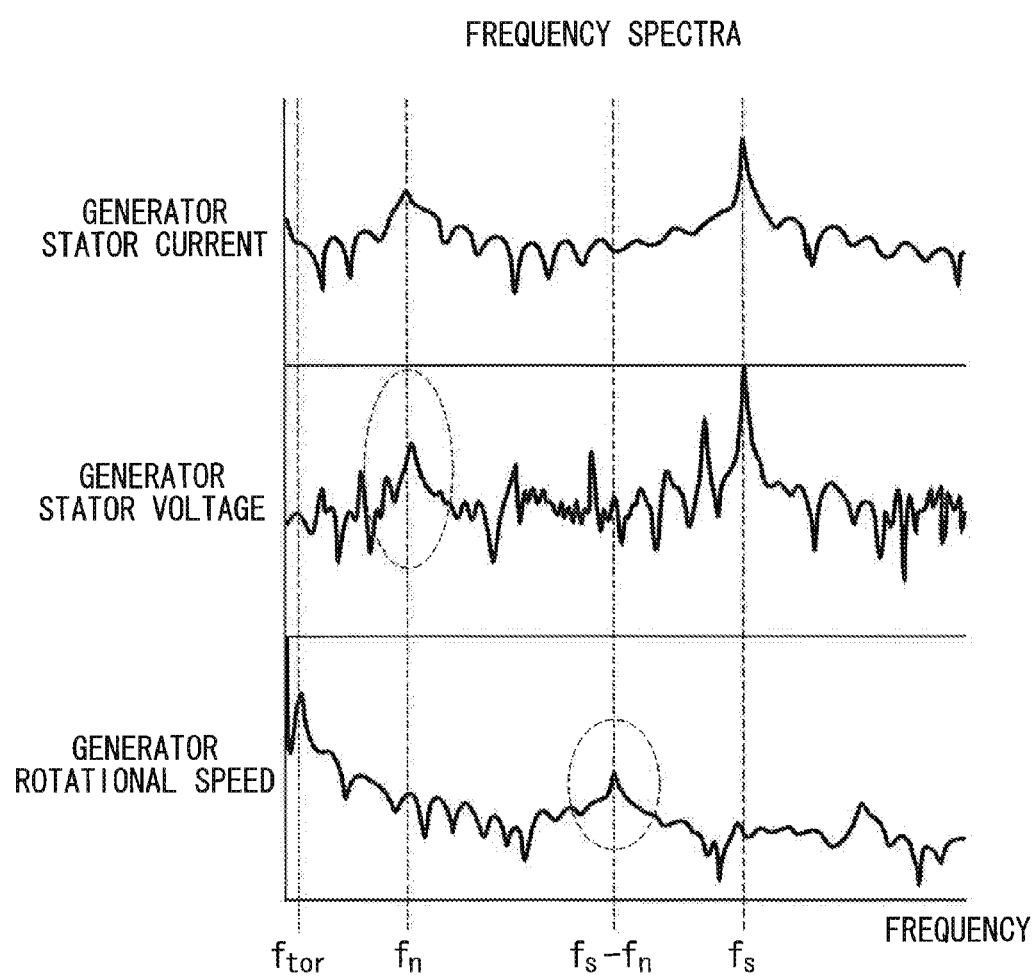
FIG. 9 is a graph showing the frequency spectra of measured generator stator current, generator stator voltage, and generator rotational speed according to the second embodiment of the present invention.

FIG. 9 is a graph showing the frequency spectra of measured generator stator current, generator stator voltage, and generator rotational speed according to the second embodiment.

As shown in FIG. 9, although a component at a shaft-torsional natural frequency $f_{tor}$ specific to the shaft of the generator 34 appears in a low frequency band in the frequency spectrum of the generator rotational speed, in the generator stator current and the generator stator voltage, no resonance component appears in a frequency band where a component at the resonance frequency $f_n$ is superposed. However, a resonance component appears at a frequency obtained by subtracting the resonance frequency $f_n$ from the grid frequency $f_s$ in the frequency spectrum of the generator rotational speed.

The reason why the resonance component appears at the frequency obtained by subtracting the resonance frequency $f_n$ from the grid frequency $f_s$ in the frequency spectrum of the generator rotational speed will be described hereinbelow.

Assuming that the main shaft 30 is a rigid shaft, the generator rotational speed and the shaft torque $\tau_g$ of the generator 34 (hereinafter referred to as "generator torque") have the relationship expressed by Equation (1) below.

{Formula 1}

$$J\frac{d\omega_g}{dt} = \tau_\omega - \tau_g \quad (1)$$

where J is the moment of inertia [kgm²] (of the rotor 18, the gear box 32, and the generator rotor), $\tau_\omega$ is the wind turbine torque [Nm], and $\omega_q$ is the generator rotational speed [rad/s].

Furthermore, the generator torque $\tau_g$ is expressed by Equation (2) below.

{Formula 2}

$$\tau_g = pM(i_{qs}i_{dr} - i_{ds}i_{qr}) \quad (2)$$

where p is the number of generator pole pairs [-], M is the mutual inductance [H] between the generator stator winding and the generator rotor winding, $i_{ds}$ is the generator stator d-axis current [A], $i_{qs}$ is the generator stator q-axis current [A], $i_{dr}$ is the generator rotor d-axis current [A], and $i_{qr}$ is the generator rotor q-axis current [A].

Here, the generator stator d-axis current $i_{ds}$ and the generator stator q-axis current $i_{qs}$ are currents converted from currents $i_{as}$, $i_{bs}$, and $i_{cs}$ in the individual phases to coordinates that rotate at the grid frequency $f_s$ and are expressed by Equation (3) below.

{Formula 3}

$$\begin{bmatrix} i_{ds} \\ i_{qs} \end{bmatrix} = \begin{bmatrix} \cos f_s t & -\sin f_s t \\ \sin f_s t & \cos f_s t \end{bmatrix} \times \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \times \begin{bmatrix} i_{as} \\ i_{bs} \\ i_{cs} \end{bmatrix} \quad (3)$$

Furthermore, the generator rotor d-axis current $i_{dr}$ and the generator rotor q-axis current $i_{qr}$ are currents converted from currents $i_{ar}$, $i_{br}$, and $i_{cr}$ in the individual phases to coordinates that rotate at a slip angular frequency (the difference between the grid frequency $f_s$ and a generator rotor rotational angular frequency $f_m$) and are expressed by Equation (4) below.

{Formula 4}

$$\begin{bmatrix} i_{dr} \\ i_{qr} \end{bmatrix} = \begin{bmatrix} \cos f_m t & \sin f_m t \\ -\sin f_m t & \cos f_m t \end{bmatrix} \times \begin{bmatrix} \cos f_s t & -\sin f_s t \\ \sin f_s t & \cos f_s t \end{bmatrix} \times \sqrt{\frac{2}{3}} \begin{bmatrix} 1 & -\frac{1}{2} & -\frac{1}{2} \\ 0 & \frac{\sqrt{3}}{2} & -\frac{\sqrt{3}}{2} \end{bmatrix} \times \begin{bmatrix} i_{ar} \\ i_{br} \\ i_{cr} \end{bmatrix} \quad (4)$$

Assume that, when the resonance component $I_{sn}$ of the frequency $f_n$ is superposed on a current $I_s$ generated in the generator stator winding, the currents $i_{as}$, $i_{bs}$, and $i_{cs}$ in the individual phases are expressed by Equation (5) below, where $\phi$ is the phase difference of the resonance component $I_{sn}$ relative to the fundamental component.

{Formula 5}

$$i_{as} = \sqrt{2}\, I_s \cos f_s t + I_{sn} \cos(f_n t - \phi) \quad (5)$$
$$i_{bs} = \sqrt{2}\, I_s \cos\left(f_s t + \frac{2}{3}\pi\right) + I_{sn} \cos\left(f_n t - \phi + \frac{2}{3}\pi\right)$$
$$i_{cs} = \sqrt{2}\, I_s \cos\left(f_s t + \frac{4}{3}\pi\right) + I_{sn} \cos\left(f_n t - \phi + \frac{4}{3}\pi\right)$$

Here, a resonance component $I_{rn}$ is superposed on a current $I_r$ generated in the generator rotor winding, and the currents $i_{ar}$, $i_{br}$, and $i_{cr}$ in the individual phases are expressed by Equation (6) below, where $\psi$ is the phase difference of the resonance component $I_{rn}$ relative to the fundamental component.

[Formula 6]

$$i_{ar} = \sqrt{2}\, I_r \cos f_s t + I_{rn} \cos(s_n f_n t - \psi) \quad (6)$$
$$i_{br} = \sqrt{2}\, I_r \cos\left(sf_s t + \frac{2}{3}\pi\right) + I_{rn} \cos\left(s_n f_n t - \psi + \frac{2}{3}\pi\right)$$
$$i_{cr} = \sqrt{2}\, I_r \cos\left(sf_s t + \frac{4}{3}\pi\right) + I_{rn} \cos\left(s_n f_n t - \psi + \frac{4}{3}\pi\right)$$

Variables s and $s_n$ in Equation (6) are slips relative to the grid frequency $f_s$ and the resonance frequency $f_n$, respectively, and are expressed by Equation (7) below.

{Formula 7}

$$s = \frac{f_s - f_m}{f_s} \quad (7)$$
$$s_n = \frac{f_n - f_m}{f_n}$$

By substituting Equation (5) into Equation (3) and substituting Equation (6) and Equation (7) into Equation (4), Equation (8) below is obtained.

{Formula 8}

$$i_{ds} = \sqrt{3}(I_s + I_{sn} \cos((f_s - f_n)t - \phi))$$
$$i_{qs} = \sqrt{3} I_{sn} \sin((f_s - f_n)t + \phi)$$
$$i_{dr} = \sqrt{3}(I_r + I_{rn} \cos((f_s - f_n)t - \psi))$$
$$i_{qr} = \sqrt{3} I_{rn} \sin((f_s - f_n)t + \psi) \quad (8)$$

Furthermore, by substituting Equation (8) into Equation (2), Equation (9) below is obtained.

{Formula 9}

$$\tau_g = 3pM[-I_{rn}I_s \sin((f_s-f_n)t+\psi)+I_rI_{sn} \sin((f_s-f_n)t+\phi) - I_{rn}I_{sn} \sin(\psi-\phi)] \quad (9)$$

As expressed by Equation (9), when resonance has occurred, a component at a frequency $(f_s-f_n)$ obtained by subtracting the resonance frequency $f_n$ from the grid frequency $f_s$ appears in the generator torque $\tau_g$. Accordingly, when resonance has occurred, a similar frequency component also appears in the generator rotational speed, as expressed by Equation (1).

Figure 10:
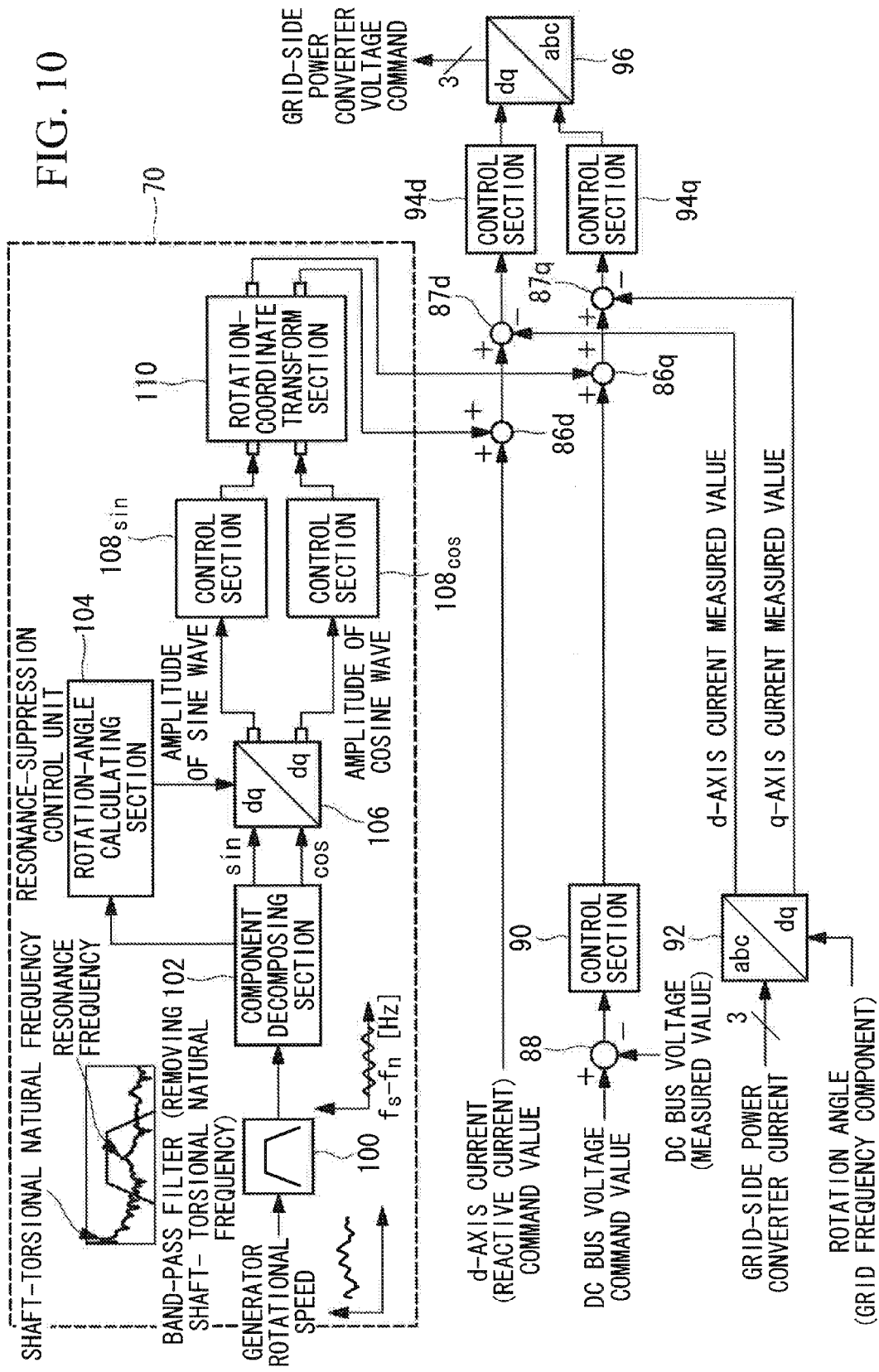
FIG. 10 is a control block diagram of a power-converter controller according to the second embodiment of the present invention for controlling a current to be made to flow from a grid-side power converter to a utility grid.
Figure 11:
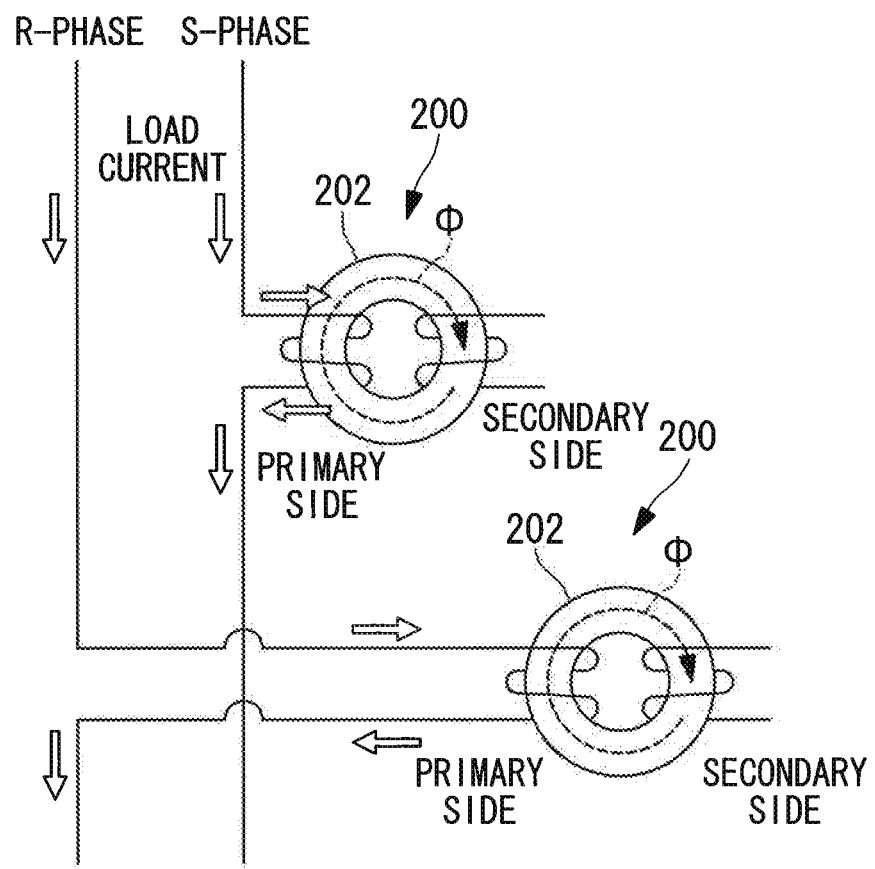
FIG. 11 is a configuration diagram of conventional current sensors using a magnetic core.
Figure 12:
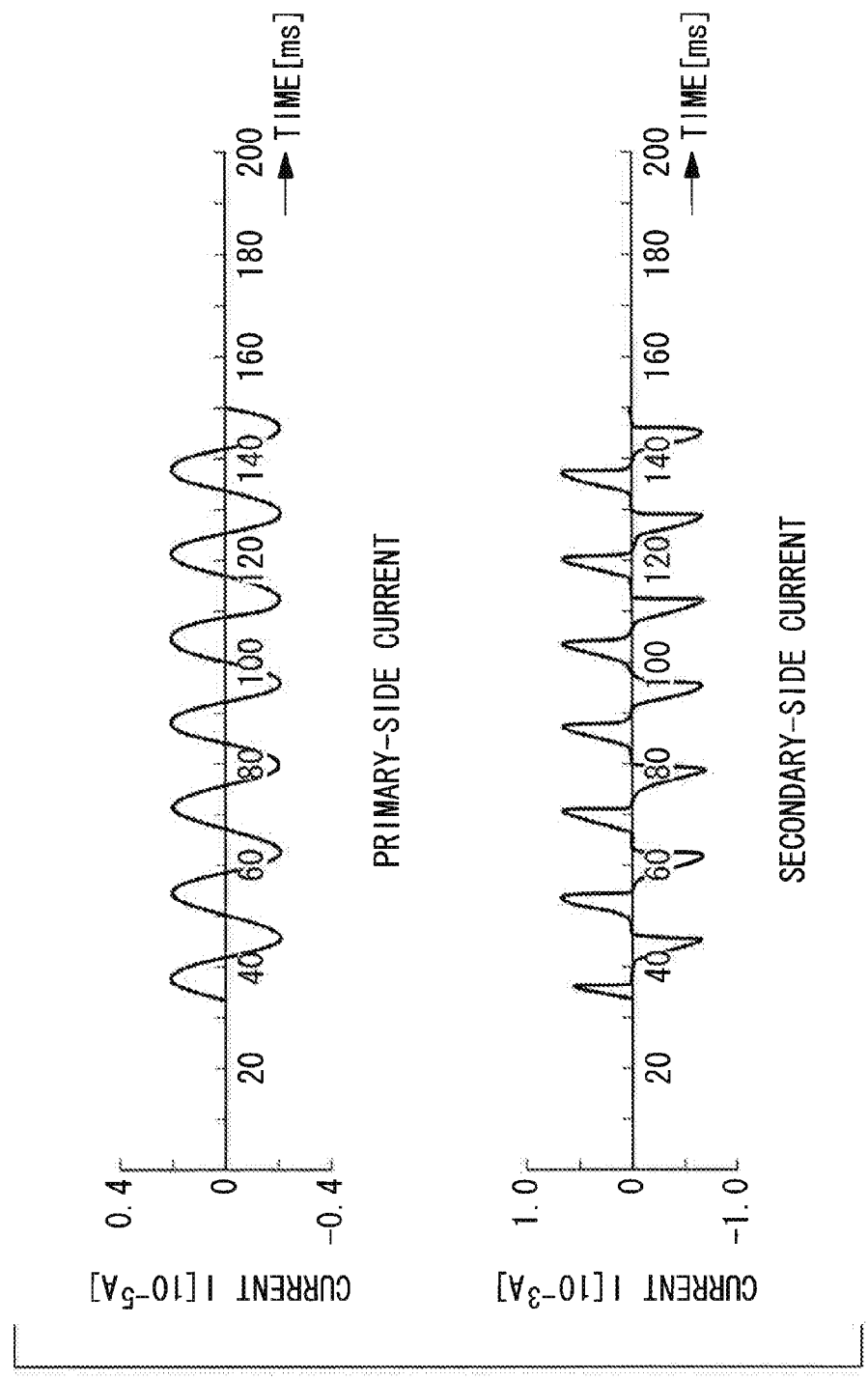
FIG. 12 is a graph showing an example of detection results of the current when the magnetic core of the conventional current sensor is saturated.

FIG. 10 is a control block diagram of the power-converter controller 46 according to the second embodiment for controlling a current to be output from the grid-side power converter 62. The same components in FIG. 10 as those in FIG. 7 are given the same reference signs as in FIG. 7, and descriptions thereof will be omitted.

A resonance-suppression control unit 70 provided in the power-converter controller 46 according to the second embodiment extracts a resonance component from the generator rotational speed. Therefore, as the resonance component, the resonance-suppression control unit 70 extracts a component at a frequency obtained by subtracting the original frequency of the resonance component from the grid frequency.

The resonance-suppression control unit 70 will be described in detail hereinbelow.

First, the generator rotational speed, which is the measurement result measured by the rotational-speed measuring section 48, is input to a resonance-component extracting section 100.

The resonance-component extracting section 100 is constituted of a band-pass filter (BPF) that passes frequencies in a band including a component at a frequency obtained by subtracting the original frequency of the resonance component from the grid frequency. Thus, the resonance-component extracting section 100 removes the shaft-torsional natural frequency from the generator rotational speed, extracts a resonance component, and outputs the resonance component to a component decomposing section 102.

The component decomposing section 102 decomposes the resonance component input from the resonance-component extracting section 100 into a sine wave and a cosine wave and outputs them to a rotation-angle calculating section 104 and a rotation-coordinate transform section 106.

The rotation-angle calculating section 104 calculates the frequency of the resonance component decomposed into the sine wave and the cosine wave by the component decomposing section 102 and outputs the frequency (rotation angle) obtained by the calculation to the rotation-coordinate transform section 106.

The rotation-coordinate transform section 106 transforms the resonance component decomposed into the sine wave and the cosine wave by the component decomposing section 102 to the amplitude of the sine wave and the amplitude of the cosine wave by using the rotation angle input from the rotation-angle calculating section 104 and outputs the amplitudes to a control section 108$_{sin}$ and a control section 108$_{cos}$, respectively.

The control section 108$_{sin}$ calculates a control command value for decreasing the amplitude by, for example, PI control or PID control, on the basis of the amplitude of the sine wave input from the rotation-coordinate transform section 106 and outputs the control command value to a rotation-coordinate transform section 110. Furthermore, the control section 108$_{cos}$ calculates a control command value for decreasing the amplitude by, for example, PI control or PID control, on the basis of the amplitude of the cosine wave input from the rotation-coordinate transform section 106 and outputs the control command value to the rotation-coordinate transform section 110.

In other words, the control section 108$_{sin}$ and the control section 108$_{cos}$ control the current that flows to the utility grid 38 so as to suppress the resonance component, on the basis of the resonance component extracted by the resonance-component extracting section 100.

The rotation-coordinate transform section 110 transforms the control command values input from the control section 108$_{sin}$ and the control section 108$_{cos}$ to coordinate components (a d-axis component and a q-axis component) before being transformed by the rotation-coordinate transform section 106 and outputs them to the adding sections 86$d$ and 86$q$, respectively.

In the second embodiment, a phase compensator may be used instead of the control section 108$_{sin}$ and the control section 108$_{cos}$ and the phase compensator delays or advances the phases of the signals to obtain the effect of attenuating the resonance component.

Although the present invention has been described using the foregoing embodiments, the technical scope of the present invention is not limited to the scope of the foregoing embodiments. Various changes and modifications can be made to the foregoing embodiments without departing from the spirit of the present invention, and the changed or modified configurations are also included in the technical scope of the present invention.

For example, although the foregoing embodiments have been described as applied to a configuration in which a resonance component is extracted from the measurement result of the generator terminal voltage or the generator rotational speed, the present invention is not limited thereto and may have a configuration in which a resonance component is extracted from the measurement result of the shaft torque of the generator 34. The shaft torque of the generator 34 is not influenced by a large current that is generated when resonance has occurred. With the configuration in which the resonance component is extracted from the measurement result of the shaft torque of the generator 34, for example, a resonance component is extracted by a resonance-suppression control unit similar to the resonance-suppression control unit 70 according to the second embodiment, and a control command value for suppressing the resonance component is calculated.

Furthermore, although the foregoing embodiments have been described as applied to a configuration in which control for suppressing the resonance component is performed for each wind turbine generator 10, the present invention is not limited thereto and may have a configuration in which the resonance-suppression control unit 70 is provided outside the wind turbine generators 10, and the resonance components of the plurality of wind turbine generators 10 are suppressed by a single resonance-suppression control unit 70. With this configuration, for example, the plurality of wind turbine generators 10 constitute a wind farm, in which at least one of the generator terminal voltage, the generator rotational speed, and the shaft torque of the generator 34 is measured from a predetermined wind turbine generator 10, a resonance component is extracted by the single resonance-suppression control unit 70, and a control signal for suppressing the resonance component is generated on the basis of the extracted resonance component. The generated control signal is then output to the power-converter controllers 46 of the individual wind turbine generators 10.

REFERENCE SIGNS LIST

10 wind turbine generator
18 rotor
20 blades
34 generator
38 utility grid
46 power-converter controller
48 rotational-speed measuring section
50 power converter
54 voltage sensor
58 generator-side power converter
60 DC bus
62 grid-side power converter
70 resonance-suppression control unit
74*d* resonance-component extracting section
74*q* resonance-component extracting section
82*d$^{ss}$* control section
82*q$^{ss}$* control section

The invention claimed is:

1. A control system applied to a wind turbine generator including a generator-side power converting unit configured to convert AC power generated in a rotor winding of the generator to DC power and to output the DC power to a DC bus; and a grid-side power converting unit configured to convert the DC power received from the DC bus to AC power with the same frequency as that of an utility grid and to output the AC power to the utility grid; the control system comprising:
 a measuring unit configured to measure three-phase generator terminal voltages; and
 a resonance-suppression control unit configured to calculate a control command value for suppressing an electrical resonance component generated due to the interconnection from the measurement result measured by the measuring unit,
 wherein the resonance-suppression control unit includes
  a first rotation-coordinate transform section configured to transform rotation coordinates of the three-phase generator terminal voltages to two phases of generator terminal voltages by using a grid frequency as a rotation angle,
  an extracting unit configured to extract a fluctuation component not synchronized with the grid frequency as the resonance component from at least one of the two phases of generator terminal voltages, and
 a calculating section configured to calculate the control command value for suppressing the resonance component extracted by the extracting unit,
 wherein a current that flows from the grid-side power converting unit to the utility grid is controlled based on the control command value calculated by the calculating section, and
 wherein the resonance-suppression control unit further includes:
  a second rotation-coordinate transform section configured to transform the resonance component to a resonance component of a DC component, and
  a subtracting section configured to calculate the difference between the resonance component of the DC component transformed by the second rotation-coordinate transform section and a target value of the DC component,
 wherein the calculating section calculates the control command value for decreasing the difference calculated by the subtracting section.

2. The control system according to claim 1, wherein the extracting section is constituted of a high-pass filter or a band-pass filter.

3. The control system according to claim 1, wherein when the magnitude of the resonance component extracted by the extracting unit exceeds a predetermined threshold value, the wind turbine generator is stopped.

4. A wind turbine generator comprising the control system according to claim 1.

5. A control system applied to a wind turbine generator including a generator-side power converting unit configured to convert AC power generated in a rotor winding of the generator to DC power and to output the DC power to a DC bus; and a grid-side power converting unit configured to convert the DC power received from the DC bus to AC power with the same frequency as that of a utility grid and to output the AC power to the utility grid; the control system comprising:
 a measuring unit configured to measure a shaft rotational speed of the generator or a shaft torque of the generator; and
 a resonance-suppression control unit configured to calculate a control command value for suppressing an electrical resonance component generated due to the interconnection from the measurement result measured by the measuring unit,
 wherein the resonance-suppression control unit includes
  an extracting section configured to extract the resonant component from the measurement result measured by the measuring unit, a component at a frequency as the resonance component being obtained by subtracting an original frequency of the resonance component from the frequency of the utility grid,
  a component decomposing section configured to decompose the resonance component extracted by the extracting section into a sine wave and a cosine wave,
  a rotation-angle calculating section configured to calculate the frequency of the resonance component decomposed into the sine wave and the cosine wave by the component decomposing section,
  a rotation-coordinate transform section configured to transform the resonance component decomposed into the sine wave and the cosine wave to the amplitude of the sine wave and the amplitude of the cosine wave by using the frequency calculated by the rotation-angle calculating section as rotation angle, and
  a calculating section configured to calculate a control command value for decreasing at least one of the amplitudes of the sine wave and the cosine wave,
 wherein a current that flows from the grid-side power converting unit to the utility grid is controlled on the basis of the control command value for decreasing at least one of the amplitudes of the sine wave and the cosine wave calculated by the calculating section.

6. The control system according to claim 5, wherein the extracting section is constituted of a band-pass filter that passes frequencies in a band including a component at a frequency obtained by subtracting the original frequency of the resonance component from the grid frequency.

7. The control system according to claim 5, wherein the calculating section is constituted of a phase comparator.

8. The control system according to claim 5, wherein when the magnitude of the resonance component extracted by the extracting unit exceeds a predetermined threshold value, the wind turbine generator is stopped.

9. A wind turbine generator comprising the control system according to claim 5.

10. A method of controlling a wind turbine generator including a generator-side power converting unit configured to convert AC power generated in a rotor winding of the generator to DC power and to output the DC power to a DC bus, and a grid-side power converting unit configured to convert the DC power received from the DC bus to AC power with the same frequency as that of an utility grid and to output the AC power to the utility grid, the method comprising:
   measuring a three-phase generator terminal voltage;
   calculating a control command value for suppressing an electrical resonance component generated due to the interconnection from the measurement result;
   with a first rotation-coordinate transform section, transforming rotation coordinates of the three-phase generator terminal voltage to a two-phase generator terminal voltage by using a grid frequency as a rotation angle;
   extracting a fluctuation component not synchronized with the grid frequency as the resonance component from at least one of the two-phase generator terminal voltages;
   calculating the control command value for suppressing the extracted resonance component;
   controlling, based on the calculated control command value, a current that flows from the grid-side power converting unit to the utility grid;
   with a second rotation-coordinate transform section, transforming the resonance component to a resonance component of a DC component;
   calculating the difference between the resonance component of the DC component transformed by the second rotation-coordinate transform section and a target value of the DC component; and
   calculating the control command value for decreasing the difference between the resonance component of the DC component transformed by the second rotation-coordinate transform section and the target value of the DC component.

11. A method of controlling a wind turbine generator including a generator-side power converting unit configured to convert AC power generated in a rotor winding of the generator to DC power and to output the DC power to a DC bus, and a grid-side power converting unit configured to convert the DC power received from the DC bus to AC power with the same frequency as that of a utility grid and to output the AC power to the utility grid, the method comprising:
   measuring a shaft rotational speed of the generator or a shaft torque of the generator;
   calculating a control command value for suppressing an electrical resonance component generated due to interconnection from the measuring;
   extracting the electrical resonance component from the measurement result measured by the measuring unit, a component at a frequency as the electrical resonance component being obtained by subtracting an original frequency of the resonance component from the frequency of the utility grid;
   decomposing the electrical resonance component into a sine wave and a cosine wave;
   calculating the frequency of the electrical resonance component decomposed into the sine wave and the cosine wave;
   transforming the electrical resonance component decomposed into the sine wave and the cosine wave to the amplitude of the sine wave and the amplitude of the cosine wave by using the frequency of the electrical resonance component decomposed into the sine wave and the cosine wave as rotation angle;
   calculating a control command value for decreasing at least one of the amplitudes of the sine wave and the cosine wave; and
   controlling, based on the calculated control command value, a current that flows from the grid-side power converting unit to the utility grid.

* * * * *